United States Patent [19]

Stent et al.

[11] Patent Number: 5,586,179
[45] Date of Patent: Dec. 17, 1996

[54] SYSTEM AND METHOD FOR ADDING AND INTEGRATING OUTBOUND CALLING AND OVERALL SYSTEM CONTROL TO AN EXISTING INBOUND TELEPHONE SYSTEM

[75] Inventors: Robert J. Stent, Westford; George Melillo, Townsend, both of Mass.; John E. Cambray, Pelham; James F. Mitchell, Windham, both of N.H.

[73] Assignee: Davox Corporation, Westford, Mass.

[21] Appl. No.: 550,280

[22] Filed: Oct. 30, 1995

Related U.S. Application Data

[63] Continuation of Ser. No. 32,844, Mar. 17, 1993, abandoned.

[51] Int. Cl.⁶ ............................................. H04M 1/64
[52] U.S. Cl. ........................... 379/265; 379/266; 379/309
[58] Field of Search ...................................... 379/265, 266, 379/309, 34, 113, 211

[56] References Cited

U.S. PATENT DOCUMENTS

| | | | |
|---|---|---|---|
| 4,894,857 | 1/1990 | Szlam et al. | 379/246 |
| 4,896,345 | 1/1990 | Thorne | 379/266 |
| 5,008,930 | 4/1991 | Gawrys et al. | 379/211 |
| 5,214,688 | 5/1993 | Szlam et al. | 379/112 |

OTHER PUBLICATIONS

William A. Durr, Jr., ACD Systems in the Telemarketing Environment, Feb. 1987, pp. 47–49.
TeleNews, Nov. 1986, Telemarketing, p. 10.

*Primary Examiner*—Ahmad F. Matar
*Attorney, Agent, or Firm*—Daniel J. Bourque; Kevin J. Carroll

[57] ABSTRACT

Disclosed is a system and method for adding and integrating outbound calling and overall system control to an existing inbound telephone system. The existing inbound telephone call distribution system is coupled to a number of telephone lines, and connects incoming calls to an available operator having a voice signal processing unit. The present system detects at least one available operator and an absence or a threshold condition of incoming calls to connect to the operator. An automated telephone dialer, coupled to the inbound call distributor, is also provided. The automated telephone dialer is responsive to the detection of at least one available operator and the absence or threshold condition of incoming calls to connect to the operator, for placing an outbound telephone call. The system directs that the voice portion of an answered outbound telephone call be connected to the existing voice signal processing unit of the available operator. Additionally, data associated with and concerning a called party presently being connected to the operator is made available to the operator answering the call at a data display unit provided at the workstation of the available operator.

19 Claims, 4 Drawing Sheets

5,586,179

SYSTEM AND METHOD FOR ADDING AND INTEGRATING OUTBOUND CALLING AND OVERALL SYSTEM CONTROL TO AN EXISTING INBOUND TELEPHONE SYSTEM

This application is a continuation of application Ser. No. 08/032,844, filed Mar. 17, 1993 (now abandoned).

FIELD OF THE INVENTION

This invention relates to telephone systems and more particularly, to a system and method for adding and integrating outbound calling and overall telephone system management and control features to an existing inbound telephone system.

BACKGROUND OF THE INVENTION

Many business and customer service organizations currently utilize automated call distribution systems which route incoming calls to operators or agents in one or more various appropriate departments or groups such as credit, repair or trouble departments. Such systems are efficient for their designated task. Moreover, companies presently utilizing such systems generally have substantial amounts of money and time invested in both system hardware and software as well as employee training to operate the system. Additionally, much of this hardware is proprietary and not designed to be used with the hardware of another manufacturer of telecommunication equipment.

Given current economic conditions, however, most businesses are now recognizing a need to also focus on customer credit and credit collection activities as well as customer service. Such activities require the use of an outbound calling telephone system. Providing an outbound calling system in a facility in which inbound calling capabilities already exist requires yet additional substantial investments in hardware, software and employee training. Most importantly, adding an outbound calling system alongside an existing inbound calling system results in tremendous waste and inefficiency including duplicative hardware and sometimes employees.

For example, providing such parallel inbound and outbound systems may require separate inbound and outbound call departments which requires additional employees and thus significantly increases a company's employee labor, benefits and training costs. Further, each group of agents, either inbound or outbound, is typically not kept busy at all times.

Alternatively, only one group of agents may be provided in which case two sets of equipment, one set for inbound call handling and one set for outbound call handling, must be provided. Such an implementation, however, requires the agents to have knowledge of the two systems. Most importantly, since both systems are operating independently, serious inefficiencies exist in coordinating an agent's activities. This may result in either an incoming caller or connected outbound called party remaining on hold for an extended period of time which is undesirable, or in the necessity to use a full time supervisor to manually assign each agent to one of an inbound or outbound call. The latter method, however, cannot take into account the telephone system's current statistical information such as the number of calls on hold, the length of time callers have been on hold, the number of outbound calls being placed and answered or the amount of time agents are spending on each call.

One prior art system for integrating outbound telephone dialing and overall system control to an existing inbound telephone system is shown in FIGS. 2 and 3. In this system, the integration is performed in the operator workstation and, upon request from the operator workstation, a server logs an available operator into the outbound telephone dialing system. The server then connects an operator to the inbound call distributor so that the intelligent operator workstation can query whether there are any inbound calls to be handled by the operator. If there are inbound calls to be handled, the operator is placed on inactive status in the outbound system and the inbound telephone system is directed to connect the inbound call to the available operator.

When an operator completes an inbound call, the intelligent workstation again interrogates the inbound telephone system through the server. If there are no inbound calls to be handled by this operator, the system makes the operator available for an outbound call. Through the server, the intelligent workstation signals the outbound calling device to place an outbound call or to transfer a previously dialed and answered outbound call to the available operator. Following "wrap-up" or completion of the outbound call, the system will again have the intelligent workstation query the inbound system to determine if the operator is needed to handle an inbound telephone call.

The problem with this system and method is that the intelligent operator workstation must constantly query the server and the inbound telephone system to perform the integration. There is no central information for the current status of each operator workstation, and there is no way of performing inquiries and automatically logging the operators onto the system based on the central statistical information.

Accordingly, what is required is a system which can be added to and transparently integrated with an existing inbound calling system without adding unnecessary or duplicative hardware to an agent's workstation, and which can automatically monitor both incoming and outbound calling activities to prioritize and maximize system performance according to various criteria established at each user site.

SUMMARY OF THE INVENTION

Accordingly, the present invention provides outbound automated telephone dialing capabilities as well as system management and supervision features to an existing inbound telephone system, thus preserving the user's investment in the inbound telephone system, minimizing the amount of equipment which an operator must be provided with and learn to use, and maximize the use of presently available telephone lines.

Utilizing the system of the present invention, any and all operators or agents connected to the inbound telephone system (ACD) can be either dynamically or manually assigned as either outbound agents or inbound agents based upon user definable criteria. This provides the user with the flexibility to determine the sequence or priority of operators which are transferred to and from inbound and outbound calling activities within the single integrated system.

Although the exact method and interconnection between the system of the present invention and a given ACD varies, the concept is the same. The system of the present invention maintains a connection to the inbound call distributor. The present system, through a system management center constantly monitors the inbound call distributor for the presence (or absence) and/or volume (threshold) of inbound calls connected or on hold as specified or established by the supervisor. If no inbound calls are present or waiting in an appropriate hold queue, all operators or agents are assigned as outbound agents with maximum efficiency being determined and obtained by the outbound dialing.

As an inbound call is received, the system of the present invention detects its presence via its connection with the inbound call distributor. The present system will, either automatically or at the request of an operator immediately log the workstation first available agent off the outbound dialer and make that agent available for inbound calls. As long as inbound calls are present, that agent will stay in an inbound mode.

As the volume of inbound calls increases, the system of the present invention allows for the transfer of additional agents from outbound calling to inbound servicing. The parameters for when and how many agents are transferred to inbound call servicing are completely user definable. For example, the parameters may be defined by the number of inbound calls in a particular hold queue after which one or more additional inbound agents are added or switched from among the outbound agents. Other possible criteria include when an inbound caller queue hold time exceeds "X" seconds and when average hold time and/or average speed of answering a call exceed a pre-established threshold.

Conversely, as the volume of inbound calls decreases or falls off, or as user defined inbound call objectives are met, the system of the present invention transfers inbound agents back to the outbound mode.

Thus, since the present system controls the switching of agents from inbound to outbound mode, the user may take full advantage of an automated dialer's call pacing or other related. The present system removes or adds agents to and from the pool of available outbound agents, while insuring that the automated dialer recognizes the change in the number of agents and adjusts its call pacing accordingly.

One embodiment of the present invention provides these features and advantages by providing a system controller or management center which is coupled to an inbound call distributor included in an existing inbound telephone call distribution system. The existing inbound call distributor is coupled to a plurality of telephone lines, and receives incoming calls from a plurality of callers. Each incoming call is distributed and connected to an available operator from among a plurality of available operators manning the system. Each available operator has a voice signal processing unit, typically a proprietary telephone set, that functions with the inbound call distributor for receiving voice signals associated with the incoming call, and for transmitting operator voice signals to the caller.

The system management center constantly monitors the inbound call distribution activities of the inbound call distributor, and detects both at least one available operator as well as the absence or a below threshold number of incoming calls to distribute and connect to an operator. The system management center provides an indication of that detection.

The present invention also includes an automated telephone dialer, coupled to the inbound call distributor and responsive to the output signal provided by the system management center indicating the detection of at least one available operator and the absence or below threshold condition of incoming calls to distribute to that operator, for placing an outbound telephone call over one of the coupled telephone lines.

The automated telephone dialer provided by the present invention detects an answered outbound call and provides at least one control signal which directs the present system to connect the answered outbound telephone call to the available operator, thus allowing the available operator to transmit and receive voice signals associated with the answered outbound telephone call on the existing operator voice signal processing unit. Further, the system of the present invention also establishes a data signal path to a data display unit provided to the available operator, for transferring data associated with and concerning the called party connected to the operator, as well as system control or supervisory commands to the operator by means of the data display unit.

Accordingly, the system and method of the present invention integrates outbound calling and system control functions to an existing inbound telephone system, yet gives priority to handling inbound calls. Further, utilizing statistical reports generated by both the inbound and outbound telephone systems, the system controller/supervisor unit of the present invention can anticipate when an operator will become available thus minimizing time both inbound callers and outbound called parties spend in a hold queue.

DESCRIPTION OF THE DRAWINGS

These, and other features and advantages of the present invention will be better understood by reading the following detailed description, taken together with the drawings wherein.

DETAILED DESCRIPTION OF THE INVENTION

Figure 1:
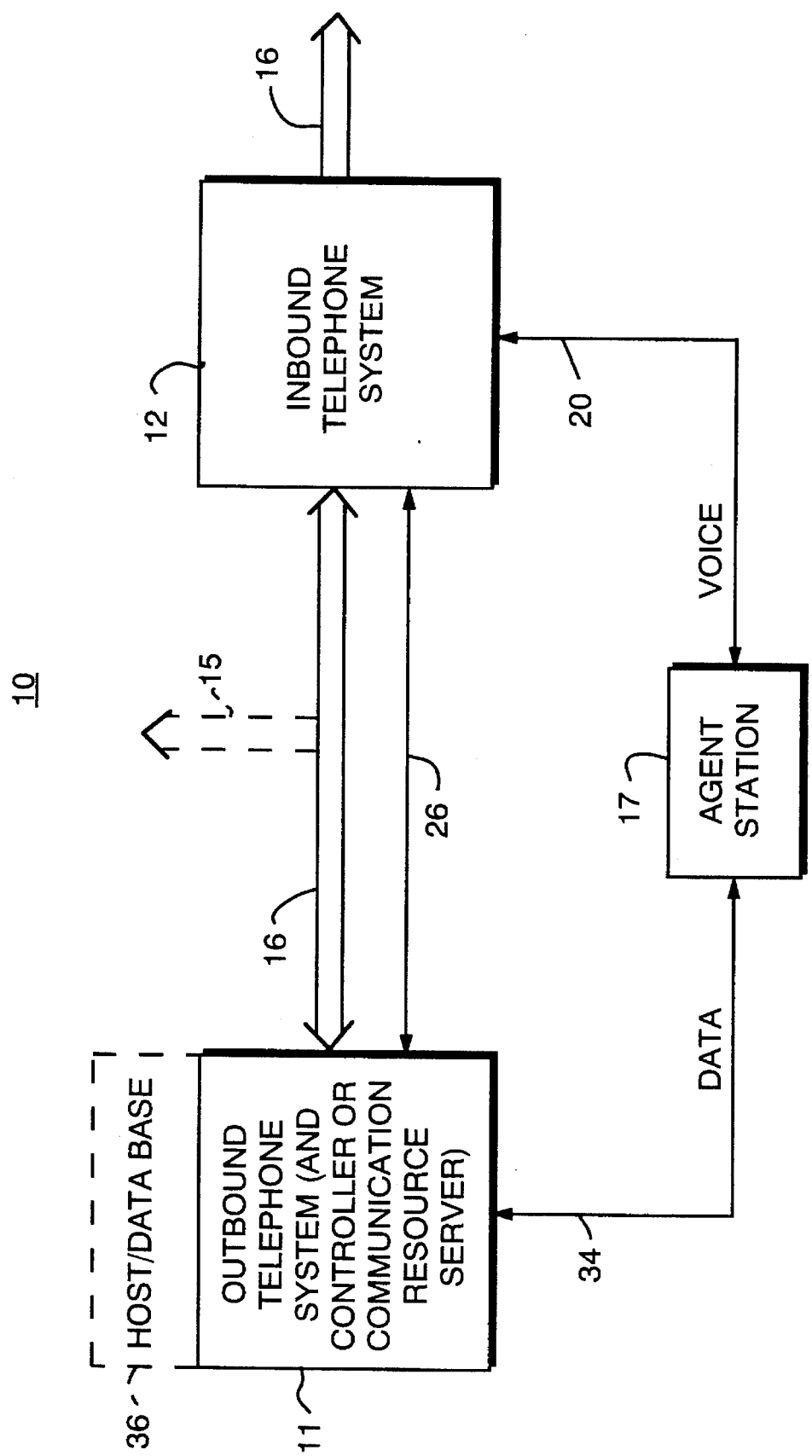
FIG. 1 is a block diagram of the system of the present invention integrating an outbound telephone system with an inbound telephone call distributor.

The system 10, FIG. 1, according to the present invention integrates outbound telephone calling and system control to an existing inbound telephone system 12. The existing inbound telephone system 12 provides a voice data link or signal path 20 to an agent at operator workstation 17. The inbound telephone system is also coupled to a number of telephone lines 16.

The present invention includes an outbound telephone system and in one embodiment, a system controller 11 or communications server which are coupled to the existing inbound telephone system by at least one control/status signal data path 26. In one implementation, a number of telephone lines 16 may also couple the outbound telephone system to the inbound telephone system. Alternatively, the outbound telephone system may be coupled to a plurality of outbound telephone lines 15 which are not coupled to the inbound telephone system. The outbound telephone system and controller 11 are also coupled to a host/data base 36 from which called party information may be retrieved.

The present invention also includes a data path 34 between the outbound telephone system and a data display and transmission unit which is provided at each operator workstation 17. Data path 34 is utilized to interface the host/database 36 with an operator or agent, to provide the operator with information about the called party presently connected to the operator, and to allow the operator to enter additional information about the called party into the database, if necessary. Further, data path 34 also provides a path over which the operator or agent may inform the outbound or inbound telephone system (dependent upon the implementation) of his or her availability, and to query the inbound system to determine if any incoming telephone calls are in queue, awaiting an available operator.

In a prior art system, both the outbound dialer and the inbound call distributor (ACD) are unaware of the integration taking place. One implementation of such a system for adding and integrating outbound calling and overall system control to an existing inbound telephone system according to the prior art system is shown generally at 10a, FIG. 2, wherein is shown an existing inbound telephone call distribution system 12 which includes an inbound call distributor 14 coupled to a plurality of telephone lines 15 and 16.

Inbound call distributor 14 receives incoming calls on the plurality of incoming telephone lines 16a, and distributes and connects each of the incoming calls to an available operator from among a plurality of operators generally connected to the system at a plurality of operator workstations 17. Examples of inbound telephone systems include a PBX as well as a Rolm 8000/9751 ACD. The present system also includes a plurality of outbound telephone lines 15 over which outbound calls may be placed.

Each operator assigned to the prior art system utilizes a voice signal processing unit such as a telephone hand or head set 18a–18b. Such voice signal processing units may be proprietary units designed to function only with the coupled ACD. Each of the voice signal processing units 18a–18b is coupled to the inbound call distributor 14 by a voice signal path 20a–20b, which allows the operator to receive voice signals associated with an incoming call distributed to the operator, and allows the operator to transmit voice signals to the caller presently connected to the operator.

The prior art system which integrates outbound calling and telephone system control to an existing inbound telephone call distribution system includes an outbound telephone system, including a communication resource server 22 which serves as a data switch. The server 22 is coupled to a manufacturer specific and proprietary supervisor port 24 on the inbound call distributor 14 by means of data signal path 26. The server 22 also connects an operator to the supervisor port 24 of the inbound call distributor to allow the workstation to query whether there are any incoming calls for the operator to handle. An example of a typical system server is a Davox CRS™ (Communication Resource Server™) available from Davox Corporation, Billerica, Mass. as well as most other shared port servers.

In this prior art system, server 22 has a passive roll, performing data switching only upon request from an operator workstation 17. An optional part of this prior art system is a telephone system management center (such as a Smart Management Center™ or SMC™ also available from Davox Corporation) 27, coupled to the outbound dialer 28, and which provides telephone system management and control functions such as dial list control and management.

Operator availability status is maintained in the automated outbound telephone dialer 28 from status information received from each operator workstation and entered by each operator on a data terminal such as data terminal 32a–32b which is provided at each operator workstation 17. Such operator status will be explained in greater detail below.

In the prior art as well as in the preferred embodiment, data sets 32a–32b include both a data terminal display screen 29 and a keyboard 31. Exemplary data terminals include personal computers or workstations such as the Davox 4900/5900 data and keyboard workstation. Since voice signals are provided to the operator by means of the existing and sometimes proprietary voice signal processing units 18a–18b, operator workstations with voice signal processing capability are not required for the present invention although such devices could be utilized.

In the prior art system, data processing units 32a–32b are coupled to the automated telephone dialer 28 through the server or CRS 25 by means of data signal paths 34a–34b.

Typically, even in inbound telephone systems, operators are assigned to groups and each group in turn is assigned to an operator hold queue to await the next available operator, for handling a particular type of call, typically for a particular problem or service requested by the caller. For example, a first group of operators may be assigned to a first hold queue to handle requests for new service from new or existing customers, while a second group of operators may be assigned to a second hold queue to handle calls from existing customers requiring service on existing products. As can be understood and is known in the art, any number of operator service groups and hold queues may be established as required by the user. Typically, such operator groups and hold queues are established by an operator supervisor or site manager from a data terminal (not shown) coupled to the inbound call distributor 14 or by the system controller/supervisor 27, as is well known in the art.

Between handling outbound calls, the intelligent operator workstation 32 checks the status of the incoming call queue which the particular operator at that workstation has been assigned to handle. If no calls are in this queue, or if the calls in the queue do not exceed the pre-established thresholds, the intelligent workstation 32 sends a signal to the outbound dialer 27, over signal path 25, to place or connect another outbound call.

The ACD queue for that operator is queried by each operator workstation 32 utilizing a preprogrammed function key on the agent's keyboard, such as a Smart Button™ provided by Davox Corporation, or built in program on the operator workstation 32.

In response to a query from at least one available operator and an absence of incoming calls to distribute and connect to that at least one available operator, the operator workstation 32 makes an outbound call available to the operator by connecting the outbound call data to the operator by means of a switch connection 25. Generally simultaneously, the operator workstation 32 directs the outbound dialer and inbound call distributor 14 to switch the voice portion of the outbound call initiated by the automated telephone dialer 28 to the available operator's voice signal processing set 18a–18b over voice signal path 20.

Also generally simultaneously with the transfer of the voice portion of the outbound call which has been placed and answered, the automated telephone dialer 28 transfers data to the data terminal 32a–32b of the available operator. The data transmitted to the available operator typically includes data associated with and concerning a called party presently being connected to the available operator and may also include informational and supervisory data. Transfer of data to an available operator approximately simultaneously with the transfer of voice signals is described in greater detail in U.S. Pat. No. 5,164,981 entitled VOICE RESPONSE SYSTEM WITH AUTOMATED DATA TRANSFER which is assigned to the assignee of the present invention and incorporated herein by reference. This data may be retrieved by the server 22 from a database 36a which may form part of the server or alternatively, from an external database or host system 36b coupled to the server.

Additionally, an optional voice response unit 38 may be coupled to the server 22, for providing interactive data exchange with an outside party who has been telephoned by the automated telephone dialer 28. Such a voice response unit is available from Davox Corporation and is described in greater detail in Applicant's U.S. Patent mentioned above.

Automated telephone dialer 28 places an outbound telephone call over one of a plurality of telephone lines 15b and optionally through the inbound call distributor 14 over lines 15a. Automated telephone dialer 28 initiates a call to a predetermined number provided by system controller/supervisor 27 or from a database 36. The predetermined telephone number to called may be provided as part of a number of telephone numbers to be called, often referred to as a telephone "campaign". Telephone campaigns may be organized by various criteria by a system manager such as by accounts overdue over 90 days, by customers who have not ordered for a certain period of time, or other similar criteria which may be established at the discretion of the user.

Figure 2:
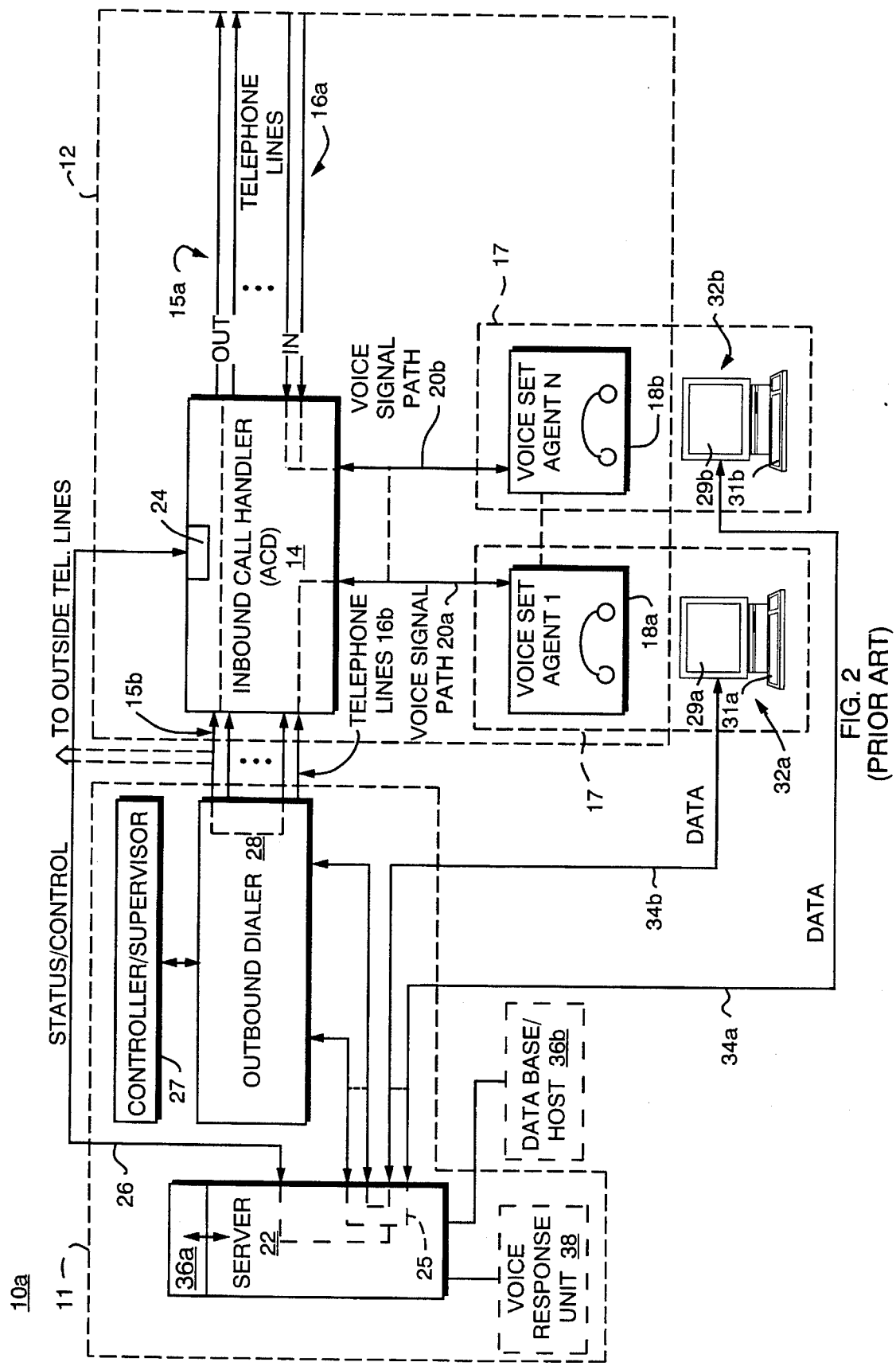
FIG. 2 is a more detailed block diagram of a prior art system which is added and integrated with an existing inbound telephone system.
Figure 3:
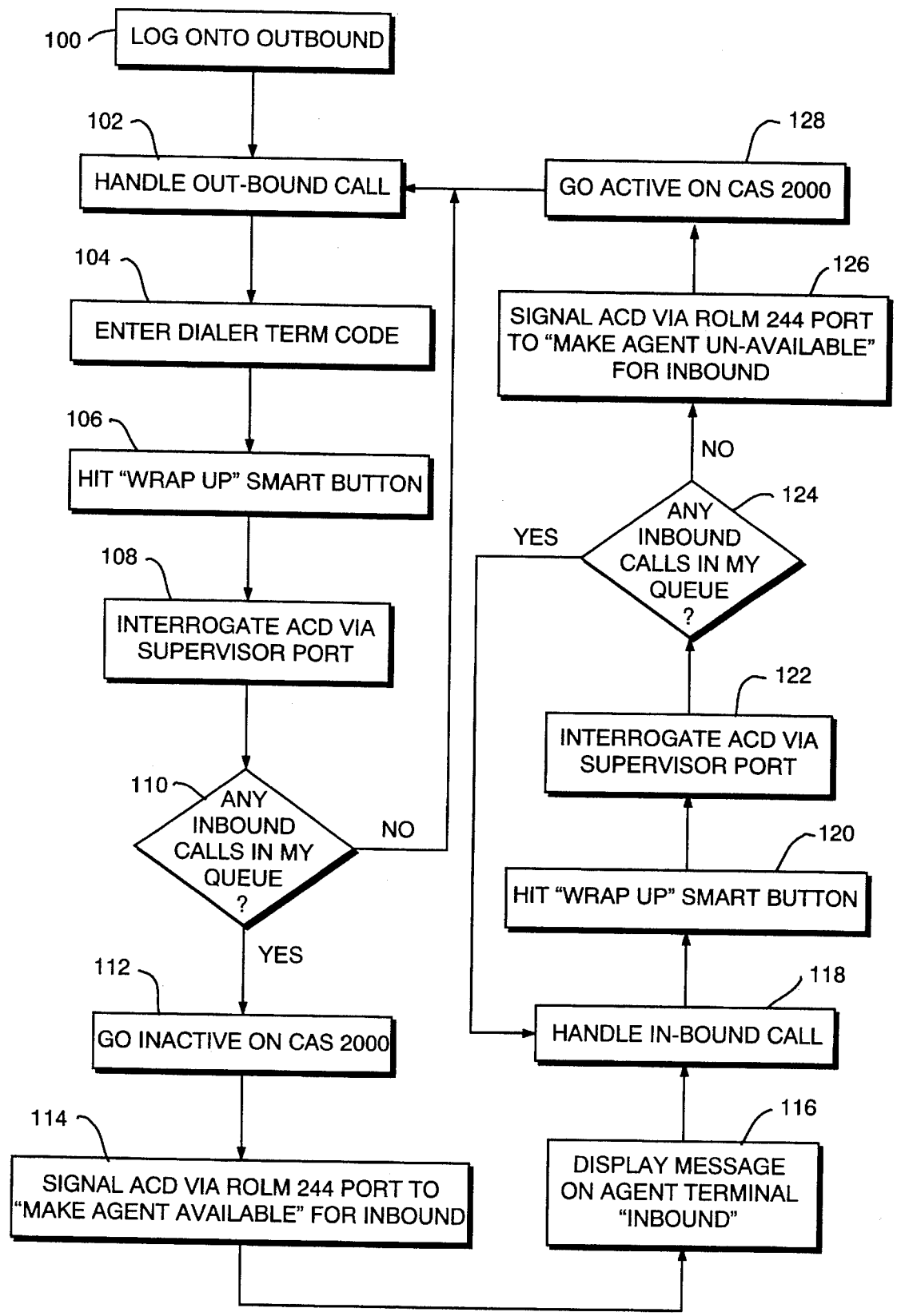
FIG. 3 is a flowchart illustrating a method according to the prior art system for adding and integrating outbound calling and overall system control to an existing inbound telephone system.

The prior art system also includes a method for integrating outbound calling and overall system control to an existing inbound telephone system one embodiment of which is represented in FIG. 3 which method corresponds generally with the embodiment of FIG. 2.

The method begins with the step of an operator logging onto the outbound automated telephone dialer via the server, step 100. After handling the outbound call, step 102, the present method includes sending a termination code to the dialer, step 104, followed sometime later by a notification that the operator has finished or "wrapped-up" the outbound call, step 106. This step may also be performed via a data terminal Smart Button™, although the present invention contemplates that there are other methods by which the operator may notify the dialer of his or her completing the handling of the outbound call.

Subsequently, the agent/operator workstation again interrogates the inbound call distributor via the inbound call distributor's supervisor port, step 108, to determine whether there are any inbound calls in the interrogating operator's hold queue, step 110. Since inbound calls are given priority, processing would continue to step 112 if there are any inbound calls, and return to step 102 if there are no inbound calls to be handled.

If there are inbound calls in the agent's hold queue, processing continues to step 112 wherein the operator is made inactive or unavailable to the outbound telephone system by refraining from using a wrap up command, and is subsequently made available to the inbound telephone system 114 by command to the supervisor port of the ACD. An operator may be made "unavailable" to the dialer by merely omitting the transmission of a "wrap up" code meaning "all done", "connect me to another" transmitted to the outbound dialer. This lack of transmission of such a code may also be done by means of a Smart Button™. Optionally, the system controller/supervisor may display the message "inbound" or other similar message on the agent's terminal, step 116, while the agent handles the incoming call, step 110.

After the agent completes the handling of the inbound call, the agent or operator workstation signals the server of this condition, step 120. In the preferred embodiment, the operator depresses a predetermined and preprogrammed function key or Smart Button™ on the data terminal. The Smart Button™ has been programmed to automatically inquire or query the ACD through the server. Such programmable keys or buttons are described in U.S. Pat. No. 5,164,981, such description of which is incorporated herein by reference.

The operator or agent workstation interrogates the inbound call distributor by means of the supervisor port, step 122, and determines whether there are any inbound calls available for the given operator, step 124. If there are remaining inbound calls in the operator's hold queue, processing returns to step 118 wherein the operator handles the inbound call.

If, however, at step 124 it is determined that there are no inbound calls in the operator's hold queue, the inbound call distributor is signalled that the operator is no longer available for inbound calls, step 126, while the outbound automated telephone dialer is also signalled that the operator is now active and available to handle outbound calls, step 128 which is accomplished by sending the "all done" or "wrap up" code to the dialer.

Although the automated telephone dialer 28 may place an outside call each time the intelligent workstation 32 informs the dialer 28 that an operator is available, thus indicating the absence of an incoming call to direct to that available operator, such a system results in a considerable amount of operator downtime waiting for the automated outbound telephone dialer 28 to place calls and provide an answered call to the available operator. A more efficient approach, however, is contemplated in the preferred embodiment wherein the system controller/supervisor 27 dynamically controls or regulates the pace at which the automated telephone dialer 28 places calls in anticipation of one or more available operators. A system for dynamically controlling call pacing is described in co-pending U.S. patent application Ser. No. 07/708,050 (now U.S. Pat. No. 5,295,184) entitled DYNAMICALLY CONTROLLABLE CALL PACING SYSTEM assigned to the assignee of the present invention, and incorporated herein by reference. Thus, the automated telephone dialer 28 does not have to wait until signaled by the operator workstation before placing a call but instead, the present system controller/supervisor 27 utilizes both real time as well as statistical information concerning both outbound and inbound call activities to regulate the pace at which outbound telephone calls are placed.

Additionally, the system controller/supervisor 27 of the present invention is adapted to place connected or answered outbound telephone calls in a hold queue, and to control the manner or sequence by which outbound calls being held in a hold queue are directed to an available operator. Such a system for managing a hold queue is described in U.S. patent application Ser. No. 07/707,707 (now U.S. Pat. No. 5,278,898) entitled SYSTEM FOR MANAGING A HOLD QUEUE assigned to the assignee of the present invention and also incorporated herein by reference.

Figure 4:
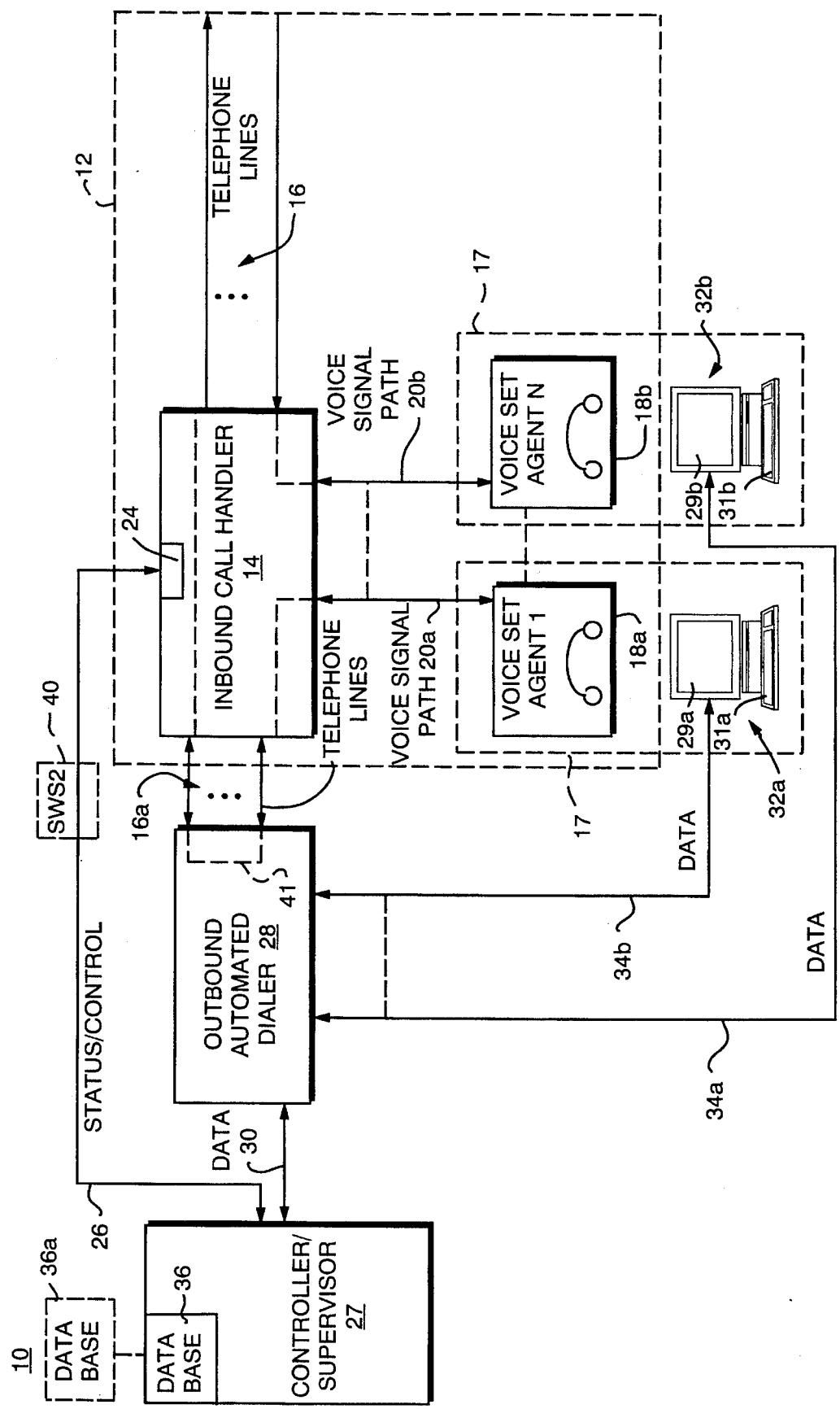
FIG. 4 is a more detailed block diagram of the preferred embodiment of the system of the present invention which is added and integrated with an existing inbound telephone system and which utilizes a system controller.

The preferred embodiment of a system of the present invention for adding and integrating outbound calling and overall system control to an existing inbound telephone system is illustrated in FIG. 4 wherein like parts to those described in prior art FIG. 2 are given like numbers and their function and definition omitted for the sake of clarity. In this embodiment, the prior art system is modified because the dedicated server is omitted and instead, the data lines 34a, 34b from operator workstations 17 are coupled directly to the outbound automated dialer 28. In this embodiment, the controller/supervisor such as a Supervisory Management Center or (SMC)™ 27 is coupled to the supervisory port 24 of the inbound call handler 14 by means of data path 26. The controller/supervisor 27 performs all inquiries and logs the operators or agents either one at a time or more than one at a time, based on incoming call volume, on and off the inbound call handler on behalf of each agent.

Thus, in this preferred embodiment of the present invention, the system controller/supervisor 27 monitors or interrogates the inbound telephone system (inbound call handler 14) to determine if there are any inbound calls which must be handled by an operator. If there are no inbound calls to be handled, one or more operators are selected and logged onto the outbound automated dialer 28 and connected to an outbound call. The connection is established by a command to supervisor port 24 or by sending a message to the operator's display screen indicating a line to call. Data from the outbound call is switched by the automated outbound dialer over data path 34 while the voice portion of the outbound call is routed through the inbound call handler and the automated outbound dialer over path 41 to the appropriate voice signal path 20 of the proper agent.

When an operator completes an outbound or an inbound call, the controller/supervisor 27 queries the inbound call handler and subsequently assigns a new inbound or outbound call to the operator, as appropriate. Although operators have been described as assignable to one of an inbound or outbound telephone call, the preferred embodiment recognizes that there may be three groups of operators, namely, an inbound group of operators which typically handle only inbound calls; a second group of operators which typically handle only outbound telephone calls; and a third group of "swing" or "reassignable" operators for which the system controller/supervisor 27 inquires after each and every call as to the status of inbound calls. This third group of operators may be re-assigned after each and every call or when thresholds are reached, to assure that the system operates in accordance with the desires of the user. This insures that no inbound calls are placed on hold for too long a period of time, and that outbound calls are also handled on a timely basis.

As also shown in FIG. 4, the present invention may utilize a switch server 40 which serves as a funnel or interface between a plurality of telephony devices such as a plurality of system controller/supervisors 27 accessing one port 24 of an inbound call handler 14. A switch server provides a standard protocol and interface into the inbound call handler 14 and allows for multiple dialers and multiple queries of the inbound call handler. Such devices are well known in the prior art including the gateway device disclosed in U.S. Pat. No. 5,097,528.

Although the system and method of the present invention have been described and illustrated by the one preferred embodiment, the present invention contemplates that "hybrid" implementations, combining features of the prior art system and the preferred embodiment of the present invention are possible. Such an embodiment may result when, for example, the inbound call distributor (ACD) cannot provide or receive all the necessary information via its supervisory port.

Modifications and substitutions by one of ordinary skill in the art are considered to be within the scope of the present invention which is not to be limited except by the claims which follow.

We claim:

1. A system for integrating outbound calling and telephone system control to an existing inbound telephone call distribution system, said existing inbound telephone call distribution system including an existing inbound call distributor, coupled to a plurality of telephone lines, for receiving incoming calls from a plurality of callers and for placing said incoming calls on hold in at least one predetermined hold queue in said inbound call distributor, each of said plurality of incoming calls to be distributed and connected to an available operator from among a plurality of operators connected to the system, each available operator having an existing voice signal processing unit coupled to said existing inbound call distributor, for receiving voice signals associated with at least an incoming call distributed to said available operator, and for transmitting operator voice signals to at least a caller initiating an incoming call and presently connected to said available operator, said system for integrating outbound calling and telephone system control comprising:

an outbound telephone system, coupled to said existing inbound call distributor of said existing inbound telephone call distribution system, and including at least an automated telephone dialer, for placing at least one outbound telephone call over at least one of said plurality of telephone lines coupled to said existing inbound call distributor, to at least one predetermined telephone number;

a telephone system controller and manager, coupled to said existing inbound telephone distribution system, for at least determining the number of incoming calls on hold in said at least one predetermined hold queue, and responsive to at least the number of said incoming calls on hold in said at least one predetermined hold queue, for directing said outbound telephone system to place an outbound telephone call, and wherein said telephone system controller and manager is responsive to the detection of an available operator, for directing said existing inbound call distributor to distribute and connect a voice portion of said answered outbound telephone call to said existing voice signal processing unit of said available operator, for transmitting and receiving operator voice signals between said available operator and said called party presently connected on said existing voice signal processing unit through said existing inbound call distributor; and wherein said telephone system controller and manager establishes a data signal path between at least one database containing called party data and a data display unit available to said at least one available operator, for at least retrieving and transferring called party data to said data display unit, said called party data associated with and concerning said called party for which said voice portion of an outbound telephone call is presently being connected to said at least one available operator.

2. The system of claim 1 wherein said automated telephone dialer is coupled to at least one database; and wherein said called party data is retrieved and transferred from said at least one database to said data display unit.

3. The system of claim 2 wherein said automated telephone dialer is coupled to at least one host computer; and wherein said at least one host computer includes said at least one database.

4. The system of claim 1 wherein said telephone system controller and manager detects an actual absence of incoming calls to said inbound call distributor.

5. The system of claim 1 wherein said telephone system controller and manager detects and indicates an anticipated absence of incoming calls to said inbound call distributor.

6. The system of claim 5 wherein said telephone system controller and manager monitors said inbound call distributor maintains and calculates an average period of time during which each operator connected to the system spends on an incoming telephone call; and wherein said telephone system controller and manager utilizes said average period of time to anticipate and detect an available operator.

7. The system of claim 1 wherein said telephone system controller and manager provides an indication of operator unavailability to said inbound call distributor upon directing said inbound call distributor to connect an answered outbound telephone call to an operator.

8. The system of claim 1 wherein said inbound call distributor assigns said plurality of operators connected to said system to a plurality of inbound call groups, and establishes a corresponding plurality of inbound call hold queues, one inbound call hold queue associated with each of said plurality of inbound call groups; and wherein said telephone system controller and manager monitors said plurality of inbound call hold queues and detects at least one available operator and determines the number of incoming calls on hold in each of said plurality of inbound call hold queues.

9. The system of claim 1 wherein said data processing unit is coupled to a supervisory port of said existing inbound telephone system.

10. The system of claim 1 wherein said telephone system controller and manager is responsive to an indication of a lack of incoming calls on hold in said at least one predetermined hold queue, for directing said outbound telephone system to place an outbound telephone call.

11. The system of claim 1 wherein said telephone system controller and manager is responsive to a reduction in the number of incoming calls on hold in said at least one predetermined hold queue to assign and distribute to said at least one available operator.

12. A method for adding and integrating outbound calling and overall system control to an existing inbound telephone system, said existing inbound telephone system including an existing inbound call distributor, coupled to a plurality of telephone lines, for receiving incoming calls, for placing incoming calls on hold in at least one predetermined hold queue of said inbound call distributor, and for distributing and connecting voice signals associated with each of said incoming calls to an available operator from among a plurality of operators connected to said existing inbound telephone system, each available operator having an existing voice signal processing unit coupled to said existing inbound call distributor, for receiving said voice signals associated with an incoming call distributed to said available operator, and for transmitting operator voice signals to a caller presently connected to said available operator, said method comprising the steps of:

determining the number of incoming calls on hold in said at least one predetermined hold queue of said inbound call distributor;

providing an automated telephone dialer, coupled to said inbound call distributor;

responsive to said determination of said number of calls on hold in said at least one predetermined hold queue, placing at least one outbound telephone call over one of said plurality of telephone lines coupled to said inbound call distributor to at least one predetermined number;

detecting an answered outbound telephone call placed by said automated telephone dialer;

responsive to said detection of an answered outbound telephone call and to said detection of at least one available operator, providing a signal directing said existing inbound call distributor to distribute and connect voice signals associated with said answered outbound telephone call to said at least one available operator, for allowing said available operator to transmit and receive said voice signals associated with said answered outbound telephone call on said existing operator voice signal processing unit;

establishing a data signal path between said automated telephone dialer and a data display unit available to said at least one available operator; and retrieving and transferring data to said data display unit provided to said at least one available operator, said data associated with and concerning a called party at said answered outbound telephone call and presently being connected to said at least one available operator.

13. The method as claimed in claim 12 further including the step of:

directing said automated telephone dialer to place outbound telephone calls over one of said plurality of telephone lines coupled to said inbound call distributor in response to detecting at least one available operator.

14. The method as claimed in claim 12 further including the step of:

directing said automated telephone dialer to place outbound telephone calls over one of said plurality of telephone lines coupled to said inbound call distributor in response to detecting an absence of incoming calls to distribute to at least one available operator.

15. The method of claim 12, further including the step of placing said answered outbound telephone call on hold in at least a one predetermined hold queue of said automated telephone dialer.

16. The method of claim 12 wherein said step of determining the number of incoming calls on hold in said at least one predetermined hold queue of said inbound call distributor includes the step of determining a reduction in the number of calls on hold in said at least one predetermined hold queue.

17. The method of claim 12 wherein said step of determining the number of incoming calls on hold in said at least one predetermined hold queue of said inbound call distributor includes the step of determining a lack of calls on hold in said at least one predetermined hold queue.

18. A system for integrating outbound calling and telephone system control to an existing inbound telephone call distribution system, said existing inbound telephone call distribution system including an existing inbound call distributor, coupled to a plurality of telephone lines, for receiving incoming calls from a plurality of callers, and for placing said incoming calls on hold in at least one predetermined hold queue of said inbound call distributor, each of said plurality of incoming calls to be distributed and connected to an available operator from among a plurality of operators connected to the system, each operator having an existing voice signal processing unit coupled to said inbound call distributor, for receiving voice signals associated with at least an incoming call distributed to said available operator, and for transmitting operator voice signals to at least a caller initiating an incoming call and presently connected to said available operator, said system for integrating outbound calling and telephone system control comprising:

a telephone system controller and manager, coupled to a supervisory port of said existing inbound call distributor of said existing inbound telephone call distribution system, for monitoring the number of said incoming calls on hold in said at least one predetermined hold queue of said inbound call distributor, and for detecting at least one of at least one available operator and a reduction in the number of incoming calls to distribute and connect to said at least one available operator, for providing at least one output signal indicating said detection of at least one of at least one available operator and a reduction in the number of incoming calls on hold in said at least one predetermined hold queue to distribute and connect to said at least one available operator, for directing said existing inbound call distributor to distribute and connect at least a voice portion of said at least one outbound telephone call answered by a called party to said at least one available operator, for transmitting and receiving voice signals to and from said called party presently being connected on said operator voice signal processing unit through said existing inbound call distributor; and an automated telephone dialer, coupled to said existing inbound call distributor and responsive to said at least one system controller and manager output signal indicating detection of at least one of at least one available operator and a reduction in the number of incoming calls on hold in said at least one predetermined hold queue to distribute and connect to said at least one available operator, for placing at least one outbound telephone call over one of said plurality of telephone lines coupled to said inbound call distributor to at least one predetermined telephone number, for placing at least one outbound call answered by a called party on hold in at least one predetermined hold queue of said automated telephone dialer, said system controller and manager for establishing a data signal path between a data base and a data display unit available to said at least one available operator, for retrieving data from said data base, and for transferring said data to said data display unit, said data associated with and concerning said called party presently being connected to said at least one available operator.

19. A method for adding and integrating outbound calling and overall system control to an existing inbound telephone system, said existing inbound telephone system including an existing inbound call distributor, coupled to a plurality of telephone lines, for receiving incoming calls and placing incoming calls on hold in at least one hold queue, and for distributing and connecting voice signals associated with each of said incoming calls to an available operator from among a plurality of operators connected to said existing inbound telephone system, said existing inbound telephone system including a plurality of existing voice signal processing units coupled to said existing inbound call distributor, for receiving said voice signals associated with an incoming call distributed to said available operator and for transmitting operator voice signals to a caller presently connected to said available operator, said method comprising the steps of:

providing an automated telephone dialer, coupled to said existing inbound call distributor, for placing at least one outbound telephone call;

providing a telephone system controller and manager, coupled to said existing inbound call distributor and to said automated telephone dialer, for at least determining the number of incoming calls on hold in said at least one hold queue;

responsive to the determination of the number of said incoming calls on hold in said at least on hold queue, placing at least one outbound telephone call with said automated telephone dialer, over one of said plurality of telephone lines coupled to said inbound call distributor, to at least one predetermined telephone number;

detecting at least one answered outbound telephone call placed by said automated dialer;

placing said at least one answered outbound telephone call in at least one hold queue of said automated telephone dialer;

directing said existing inbound call distributor to distribute and connect voice signals associated with said at least one answered outbound telephone call on hold in said at least one hold queue of said automated telephone dialer to an available operator;

establishing a data signal path between a data storage device and a data display unit of an available operator; and retrieving and transferring data to said data display unit of said available operator from said data storage device, said data associated with and concerning a called party on said answered outbound telephone call being connected to said available operator.

\* \* \* \* \*